(12) United States Patent
Mercier (10) Patent No.: US 11,537,833 B2
(45) Date of Patent: *Dec. 27, 2022

(54) METHOD FOR COMMUNICATION BETWEEN CIRCUITS

(71) Applicant: STMicroelectronics (Rousset) SAS, Rousset (FR)

(72) Inventor: Julien Mercier, Mimet (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/492,839

(22) Filed: Oct. 4, 2021

(65) Prior Publication Data

US 2022/0027699 A1 Jan. 27, 2022

Related U.S. Application Data

(63) Continuation of application No. 17/028,493, filed on Sep. 22, 2020, now Pat. No. 11,151,435.

(30) Foreign Application Priority Data

Oct. 4, 2019 (FR) ..................................... 1911040

(51) Int. Cl.
*G06K 19/07* (2006.01)

(52) U.S. Cl.
CPC ..... *G06K 19/0709* (2013.01); *G06K 19/0715* (2013.01); *G06K 19/0718* (2013.01); *G06K 19/0723* (2013.01)

(58) Field of Classification Search
CPC .......... G06K 19/0709; G06K 19/0715; G06K 19/0718; G06K 19/0723
See application file for complete search history.

(56) References Cited

U.S. PATENT DOCUMENTS

| | | |
|---|---|---|
| 2006/0143348 A1 | 6/2006 | Wilson et al. |
| 2018/0089120 A1 | 3/2018 | Riekstins et al. |
| 2018/0219680 A1 | 8/2018 | Kamal et al. |
| 2018/0268274 A1 | 9/2018 | Lowe |
| 2019/0236321 A1 | 8/2019 | Poon et al. |
| 2020/0064901 A1 | 2/2020 | Almers et al. |

FOREIGN PATENT DOCUMENTS

WO 2019175174 A1 9/2019

OTHER PUBLICATIONS

NPI Search Report and Written Opinion for FR 1911040 dated Apr. 17, 2020 (15 pages).
Intel: "Enhanced Serial Peripheral Interface (eSPI) Interface base Specification (for client and Server Platforms)", Feb. 1, 2016 (130 pages).

*Primary Examiner* — Nabil H Syed
(74) *Attorney, Agent, or Firm* — Crowe & Dunlevy (57) ABSTRACT

A first element and a second element of a same device communicate with each other. The first element sends the second element a first piece of information representative of energy supplied by an electromagnetic field supplying power the device. The second element adapts its operating frequency as a function of the first piece of information.

20 Claims, 7 Drawing Sheets

METHOD FOR COMMUNICATION BETWEEN CIRCUITS

CROSS REFERENCE TO RELATED APPLICATIONS

This application is a continuation of U.S. application for patent Ser. No. 17/028,493, filed Sep. 22, 2020, which claims the priority benefit of French Patent application number 1911040, filed on Oct. 4, 2019, the contents of which are hereby incorporated by reference in their entireties to the maximum extent allowable by law.

TECHNICAL FIELD

The present disclosure relates generally to electronic circuits and, more specifically, to the systems in which two circuits are capable of communicating with one another.

BACKGROUND

Many applications are known in which an electronic device is devoid of an internal power source, such that circuits embedded on this device can only be activated when sufficient energy is supplied to them, externally, by another device. This is, in particular, the case of certain contactless cards which draw, generally from an electromagnetic field emitted by a reader located within range, the electrical energy necessary for the power supply of their circuits. These circuits have, if applicable, a limited electrical power that should be used as well as possible to guarantee an optimal operation of the device to which they belong.

Two circuits of such a device can sometimes, as long as they are suitably powered and after having been activated, communicate with one another. An effort is then made to ensure that the communication link has the smallest possible number of conductors, in order to take up limited space in or on the device.

There is a need to optimize the power consumed by two circuits capable of communicating with one another.

SUMMARY

According to one aspect, it is provided to limit the number of conductors of a link used for communication between two circuits.

According to another aspect, it is provided to transmit information relative to outside constraints to the circuits.

An embodiment addresses all or some of the drawbacks of known communication methods.

An embodiment provides a method for communication between a first element and a second element, in which: a first channel conveys a synchronization signal; second and third channels convey two data signals; and fourth and fifth channels convey two signals configured to control an output of a standby mode respectively of the first element and the second element, the first through fifth channels, being transmitted over three or four conductors.

According to an embodiment, the signals conveyed by the fourth and fifth channels are further configured to control a placement in standby mode respectively of the first element and the second element.

According to an embodiment, the conductors couple, preferably connect, respectively, input-output terminals of the first element to input-output terminals of the second element.

According to an embodiment, the first element electrically supplies the second element.

According to an embodiment, two additional conductors couple, preferably connect, the first element to the second element and are respectively brought, by the first element, to an electrical supply potential and to an electrical reference potential.

According to an embodiment, the first element is placed in standby mode after having transmitted a control to the second element.

According to an embodiment, the second element is placed in standby mode after having transmitted a response to the first element.

According to an embodiment, the first element and the second element belong to a same device.

According to an embodiment, the first element controls the placement of the second element in standby mode in order to communicate with the outside of the device.

According to an embodiment, the device communicates with the outside by a radiofrequency signal.

According to an embodiment, the first element is a secure electronic circuit.

According to an embodiment, the second element is a microcontroller.

According to an embodiment, the second element is coupled, preferably connected, to a fingerprint sensor.

According to an embodiment, the fingerprint sensor is part of the device.

According to an embodiment, the first element electrically supplies the fingerprint sensor.

An embodiment provides a method for communication between a first element and at least one second element of a same device, in which: the first element sends the second element a first piece of information representative of energy supplied by an electromagnetic field supplying the device; and the second element adapts its operating frequency as a function of the first piece of information.

According to an embodiment, the first piece of information is an intensity of an electrical supply current of the device from the electromagnetic field.

According to an embodiment, the first piece of information is evaluated by the first element.

According to an embodiment: the first element sends the second element a second piece of information representative of a remaining time budget of the device; and the second element performs a number of operations as a function of the second piece of information.

According to an embodiment, the second piece of information is evaluated by the first element.

According to an embodiment: the first element sends the second element a third piece of information representative of a voltage budget of the device; and the second element adapts an internal configuration as a function of this third piece of information.

According to an embodiment, the third piece of information is evaluated by the first element.

According to an embodiment, the first element supplies the second element.

According to an embodiment, the first element is a secure electronic circuit.

According to an embodiment, the second element is a microcontroller.

According to an embodiment, the second element is coupled, preferably connected, to a fingerprint sensor.

According to an embodiment, the fingerprint sensor is part of the device.

According to an embodiment, the first element supplies the fingerprint sensor.

According to an embodiment, the device communicates with the outside without contact, by a radiofrequency signal, or with contact.

An embodiment provides a device configured to carry out the method as described.

An embodiment provides a payment card configured to carry out the method as described.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various Figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the generation of the exchanged signals and data as well as their interpretation have not been described in detail, the described embodiments and modes of implementation being compatible with the standard techniques for generating and interpreting these signals and data.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

In the following disclosure, a "binary signal" refers to a signal that alternates between a first constant state, for example a low state, denoted "0", and a second constant state level, for example a high state, denoted "1". The 0 and 1 states of different binary signals of a same electronic circuit can be different high and low levels. In practice, the binary signals can correspond to voltages or currents that may not be perfectly constant in the high or low state.

Figure 1:
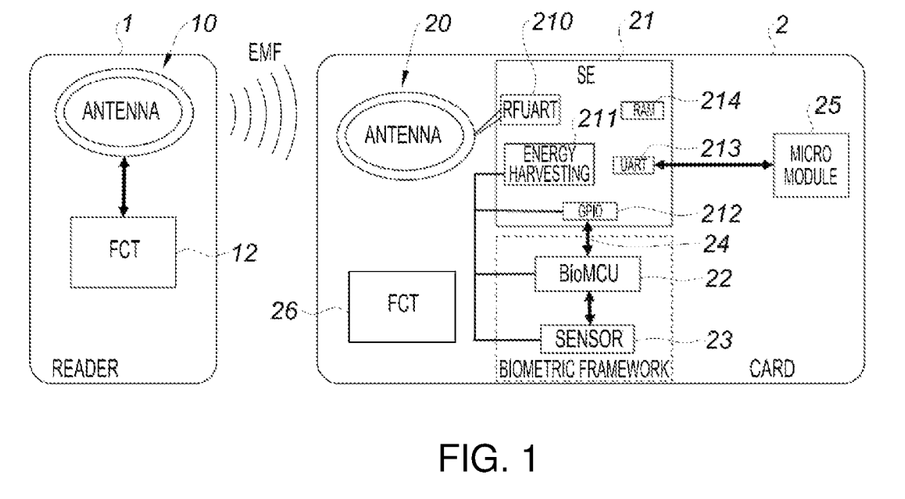
FIG. 1 shows, schematically and in block diagram form, an embodiment of a near field communication system.

FIG. 1 shows, schematically and in block diagram form, an embodiment of a near field communication (NFC) system.

In FIG. 1, a first near field communication device 1 (READER) communicates with a second near field communication device 2 (CARD). According to this embodiment, the first near field communication device 1 is, for example, a contactless payment reader or terminal 1 or a mobile telephone having this function. The second near field communication device 2 is, for example, a contactless payment bank card 2.

The terminal 1 includes an antenna 10 (ANTENNA). This antenna 10 is, in particular, configured to emit an electromagnetic field (EMF) generated by one or several electronic circuits of the terminal 1, these electronic circuits being symbolized, in FIG. 1, by a single functional block 12 (FCT). In a case where the bank card 2 is located within range of the terminal 1, the electromagnetic field emitted by this terminal 1 can then be detected by an antenna 20 (ANTENNA) of this card 2. The terminal 1 is then said to be operating in "reader" mode, while the card 2 is operating in "card" mode.

The card 2 includes, aside from the antenna 20, a first element 21 (SE) or circuit 21 and a second element 22 (BioMCU) or circuit 22. The first element 21 is preferably a secure electronic component. According to this embodiment, in which the card 2 is a contactless payment bank card, the first element 21 can be a microcontroller 21 configured to perform secure tasks, for example operations associated with banking transactions between the card 2 and the terminal 1. The second element 22 is suitable for processing biometric data acquired by one or several sensors 23 (SENSOR). The second element 22 is preferably a microcontroller unit (MCU). The second element 22 can be a generic microcontroller unit or a biometric microcontroller unit, in other words an electronic component dedicated to the processing of biometric data.

According to a preferred embodiment, the microcontroller unit 22 differs from the microcontroller unit 21 primarily in that this microcontroller unit 22: executes, for an electrical power consumption substantially equal to that of the microcontroller 21, more than a million instructions per second (MIPS), in particular instructions related to image processing operations; is capable of managing one or several modes in which its electrical power consumption is greatly reduced, preferably by several orders of magnitude relative to a nominal operating mode, for example a low consumption mode at about 50 μA and a nominal mode at 10 mA; embeds a greater quantity of RAM than that of the microcontroller unit 21 (for example 100 kB for the microcontroller unit 22 versus 16 kB for the microcontroller unit 21) in order to execute biometric algorithms; and integrates several interfaces, in particular allowing this microcontroller unit 22 to communicate with the first microcontroller unit 21 and with the sensor 23.

FIG. 1 shows a single sensor 23 (SENSOR) associated with the second element 22. This sensor 23 is, for example, a fingerprint sensor accessible from the front face of the bank card 2. The second element 22 is then, for example, a microcontroller steering the acquisition, by the sensor 23, of images corresponding to fingerprints of a user of the card 2 and which executes one or several applications for analysis of these images. The second element 22 and the fingerprint sensor 23 jointly form a biometric framework (BIOMETRIC FRAMEWORK).

According to this embodiment, the first element 21, in particular, includes: a first transceiver, for example of the universal asynchronous type, for radiofrequency signals 210 (Radio-Frequency Universal Asynchronous Receiver Transmitter—RFUART); an energy harvesting module 211 (ENERGY HARVESTING); input-output terminals or studs (General Purpose Input-Output), symbolized by a single block 212 (GPIO); a second transceiver, for example of the universal asynchronous type, 213 (Universal Asynchronous Receiver Transmitter—UART); and a memory module 214 (RAM), for example a volatile storage memory.

In FIG. 1, the first transceiver 210 is coupled, preferably connected, to the antenna 20 of the card 2. This transceiver in particular allows the card 2 to receive the radiofrequency signals emitted by the terminal 1 when this card 2 is located within range of this terminal 1. The card 2 thus communicates with the outside by a radiofrequency signal.

The energy harvesting module 211 is, in particular, configured to draw electrical energy on the electromagnetic field emitted by the terminal 1. This module 211 in particular serves to supply electricity to the first element 21. The first element 21 supplies electricity to the second element 22 and the biometric sensor 23 of the card 2.

The input-output terminals 212 of the first element 21 are coupled, preferably connected, to the second element 22. These terminals 212 can be configured either to serve as an input, in other words, to receive a signal, or to serve as an output, in other words to transmit a signal. The terminals 212 allow two-way data exchanges between the first element 21 and the second element 22 means of a link 24 symbolized, in FIG. 1, by a double arrow.

Still in FIG. 1, the second transceiver 213 of the first element 21 is coupled, preferably connected, to a module 25 (MICRO MODULE) of the card 2. This module 25 allows the card 2 to communicate with the terminal 1 in a case where this card 2 is physically coupled or connected to this terminal 1. This case corresponds to a situation where the card 2 is inserted into the terminal 1 in order to make a payment with contact. In such a situation, the exchange of data and the supply of the card 2 both go through conductive tracks located on the front face of this card 2.

The card 2 can also include one or several other electronic elements or circuits. These electronic elements or circuits, the operation of which will not be described in detail in the description below, are symbolized in FIG. 1 by a single functional block 26 (FCT).

It should be noted that the schematic illustration of FIG. 1 is not meant to faithfully reproduce an actual physical arrangement of the devices 1 and 2. In particular, the various elements that make up the terminal 1 and the card 2 are not shown to scale and can, in practice, be arranged differently from what is illustrated in FIG. 1.

Figure 2:
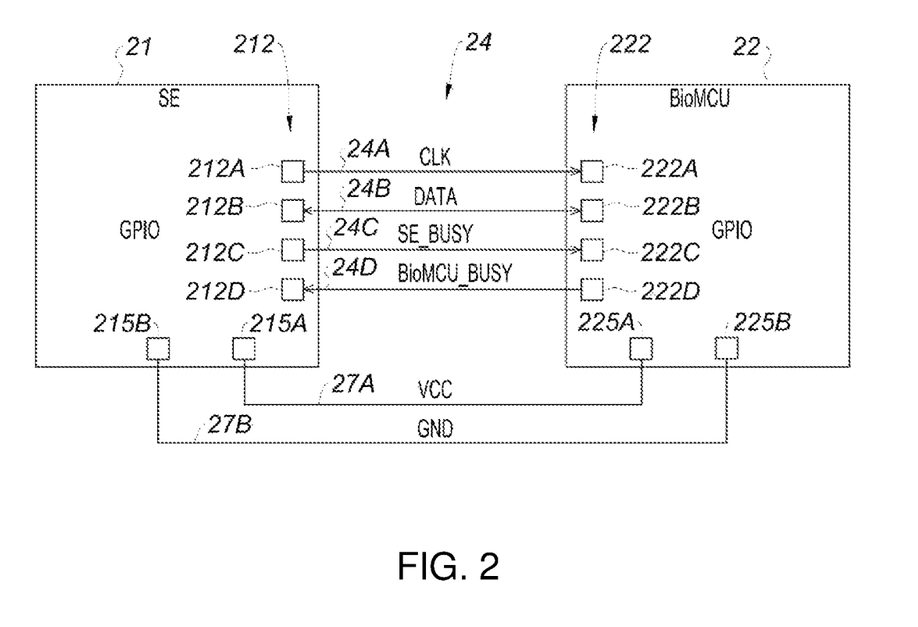
FIG. 2 shows, schematically and in block diagram form, an embodiment of circuits of a device of the system communicating with one another by a wired link.

FIG. 2 shows, schematically and in block diagram form, an embodiment of the circuits 21 and 22 of the device 2 of the system. These circuits 21 and 22 communicate with one another through the wired connection 24.

According to this embodiment, the first circuit 21 includes four input-output terminals 212 (GPIO), for example universal: a first terminal 212A coupled, preferably connected, to a first conductor or wire 24A configured to transmit a first channel conveying a synchronization or clock signal (CLK); a second terminal 212B coupled, preferably connected, to a second conductor or wire 24B configured to transmit third and fourth channels respectively conveying two data signals (DATA); a third terminal 212C coupled, preferably connected, to a third conductor or wire 24C configured to transmit a fourth channel conveying a third signal (SE_BUSY); and a fourth terminal 212D coupled, preferably connected, to a fourth conductor or wire 24D configured to transmit a fifth channel conveying a fourth signal (BioMCU_BUSY).

Similarly, the second circuit 22 includes four universal input-output terminals 222 (GPIO): a first terminal 222A coupled, preferably connected, to the first conductor 24A; a second terminal 222B coupled, preferably connected, to the second conductor 24B; a third terminal 222C coupled, preferably connected, to the third conductor 24C; and a fourth terminal 222D coupled, preferably connected, to the fourth conductor 24D.

According to this embodiment, the first circuit 21 further includes: a fifth terminal 215A coupled, preferably connected, to a fifth conductor or wire 27A brought to an electrical potential (VCC) making it possible to supply the second circuit 22 from the first circuit 21; and a sixth terminal 215B coupled, preferably connected, to a sixth conductor or wire 27B brought to a reference potential, for example the ground (GND).

Similarly, the second circuit 22 further includes: a fifth terminal 225A coupled, preferably connected, to the fifth conductor 27A; and a sixth terminal 225B coupled, preferably connected, to the sixth conductor 27B.

According to an embodiment, the fingerprint sensor 23 (FIG. 1) includes two terminals similar to the terminals 225A and 225B of the second circuit 22. These two terminals of the sensor 23 are then respectively coupled, preferably connected, to the conductors 27A and 27B. The fingerprint sensor 23 is then supplied with electricity by the first circuit 21.

In general, a master device (Master) coupled to a slave device (Slave) by a synchronous serial data bus (Serial Peripheral Interface—SPI) communicates according to a master-slave scheme, in which the master device controls the communication. In practice, such as serial data bus typically includes four conductors, each conveying a signal in a unidirectional manner. In other words, each signal is transmitted either from the master toward the slave, or from the slave toward the master.

Traditionally, a synchronous serial data bus between a master device and a slave device more specifically includes: a first conductor conveying a clock signal, generated by the master device; a second conductor conveying a first data signal (Master Output, Slave Input—MOSI), generated by the master device for the slave device; a third conductor conveying a second data signal (Master Input, Slave Output—MISO), generated by the slave device for the master device; and a fourth conductor conveying a selection signal of the slave device, generated by the master device.

Contrary to the conventional case described hereinabove, the first circuit 21 and the second circuit 22 of the embodiment of FIG. 2 here communicate with one another through a data bus SPI made up solely of two conductors, the conductors 24A and 24B of the link 24, according to this embodiment. The first circuit 21 constitutes a master circuit, while the second circuit 22 constitutes a slave circuit. The data exchanges between the first circuit 21 and the second circuit 22 take place at the initiative of the first circuit 21.

Here, advantage is taken of the fact that the circuits 21 and 22 are the only two circuits that wish to communicate with one another. The usual selection signal is therefore not necessary.

The first conductor 24A here conveys the synchronization signal CLK, configured to pace the data exchanges between the master circuit 21 and the slave circuit 22. The second conductor 24B conveys the data signal DATA, representative of the data exchanged between the master circuit 21 and the slave circuit 22. More specifically, still according to this embodiment, the second conductor 24B is configured sometimes to convey the data signal MOSI, emitted by the master circuit 21 to the slave circuit 22, and sometimes to convey the data circuit MISO, emitted by the slave circuit 22 to the master circuit 21. The data signal DATA thus corresponds either to the signal MOSI or to the signal MISO, as a function of the direction in which the data are exchanged.

Such a communication, between the first circuit 21 and the second circuit 22, is qualified as half-duplex bidirectional, or "SPI IP", communication. This SPI IP mode has the advantage of reducing the number of terminals or pins or pads involved for the communication between the circuits 21 and 22, in particular due to the alternating transmission of the MOSI and MISO signals on the same conductor 24B. The embodiment disclosed in relation with FIG. 2 therefore makes it possible to limit the number of hardware interfaces, terminals or conductors, used for the communication between these circuits 21 and 22.

According to a preferred embodiment, the third signal SE_BUSY and the fourth signal BioMCU_BUSY are binary signals, evolving between a high level and a low level. These signals SE_BUSY and BioMCU_BUSY, in particular, make it possible to synchronize data exchanges between the first circuit 21 and the second circuit 22.

The signals SE_BUSY and BioMCU_BUSY are configured to control an exit from a standby mode, or low power consumption mode, of the first circuit 21 and the second circuit 22. These signals SE_BUSY and BioMCU_BUSY are further configured to control a placement in standby mode of this first circuit 21 and this second circuit 22. This makes it possible to manage the power consumption of the second device 2 to which the first circuit 21 and the second circuit 22 belong. It is thus, in particular, possible to reduce the electrical power consumption of the second device 2 relative to a similar device whose first and second circuits are not switched to standby mode.

The first circuit 21 can, for example, be a microcontroller unit having four input-output terminals initially configured to allow a conventional communication SPI on four wires. Such a circuit can advantageously be reconfigured to be made compatible with the communication method described in this disclosure. One thus retains, for an unchanged number of wires, functionalities close to those of a conventional SPI communication between a master device or circuit and a slave device or circuit, while adding the possibility of exchanging the two signals SE_BUSY and BioMCU_BUSY between these devices or circuits.

According to a preferred embodiment, the input-output terminals 212 of the first circuit 21 are configured as follows: the first terminal 212A is configured as an output, in order to transmit the signal CLK to the second circuit 22; the second terminal 212B is alternatively configured as an input, to receive the signal MISO transmitted by the second circuit 22, or as output, to transmit the signal MOSI to this second circuit 22; the third terminal 212C is configured as an output, in order to transmit the signal SE_BUSY to the second circuit 22; and the fourth terminal 212D is configured as an input, to receive the signal BioMCU_BUSY transmitted by the second circuit 22.

Still according to this preferred embodiment, the input-output terminals 222 of the second circuit 22 are configured as follows: the first terminal 222A is configured as an input, to receive the signal CLK transmitted by the first circuit 21; the second terminal 222B is alternatively configured as an input, to receive the signal MOSI transmitted by the first circuit 21, or as output, to transmit the signal MISO to this first circuit 21; the third terminal 222C is configured as an input, to receive the signal SE_BUSY transmitted by the first circuit 21; and the fourth terminal 222D is configured as an output, to transmit the signal BioMCU_BUSY to the first circuit 21.

In a variant, the first circuit 21 and the second circuit 22 each include only three input-output terminals, these terminals being coupled, preferably connected, to three conductors: a first conductor configured to transmit first and second channels respectively conveying the synchronization signal CLK and the signal SE_BUSY, these two signals not being transmitted at the same time; a second conductor configured to transmit third and fourth channels respectively conveying the signals MOSI and MISO; and a third conductor configured to transmit a fifth channel conveying the signal BioMCU_BUSY.

According to this variant: the terminals of the first circuit 21 coupled, preferably connected, to the first conductor are configured as outputs, in order to transmit either the synchronization signal CLK, or the signal SE_BUSY; and the terminals of the second circuit 22 coupled, preferably connected, to this first conductor are configured as inputs, in order to receive either the synchronization signal CLK, or the signal SE_BUSY.

An advantage of this variant is to make it possible to use only three conductors. In a situation where the first and second circuits 21, 22 each include four terminals, only three of these terminals are used to carry out the method described in this disclosure. One thus frees one terminal of each circuit and a fourth conductor to perform other functions.

The role of the signals CLK, DATA, SE_BUSY and BioMCU_BUSY is disclosed in more detail below in an embodiment of a communication method described in relation with FIGS. 3 to 8.

Figure 3:
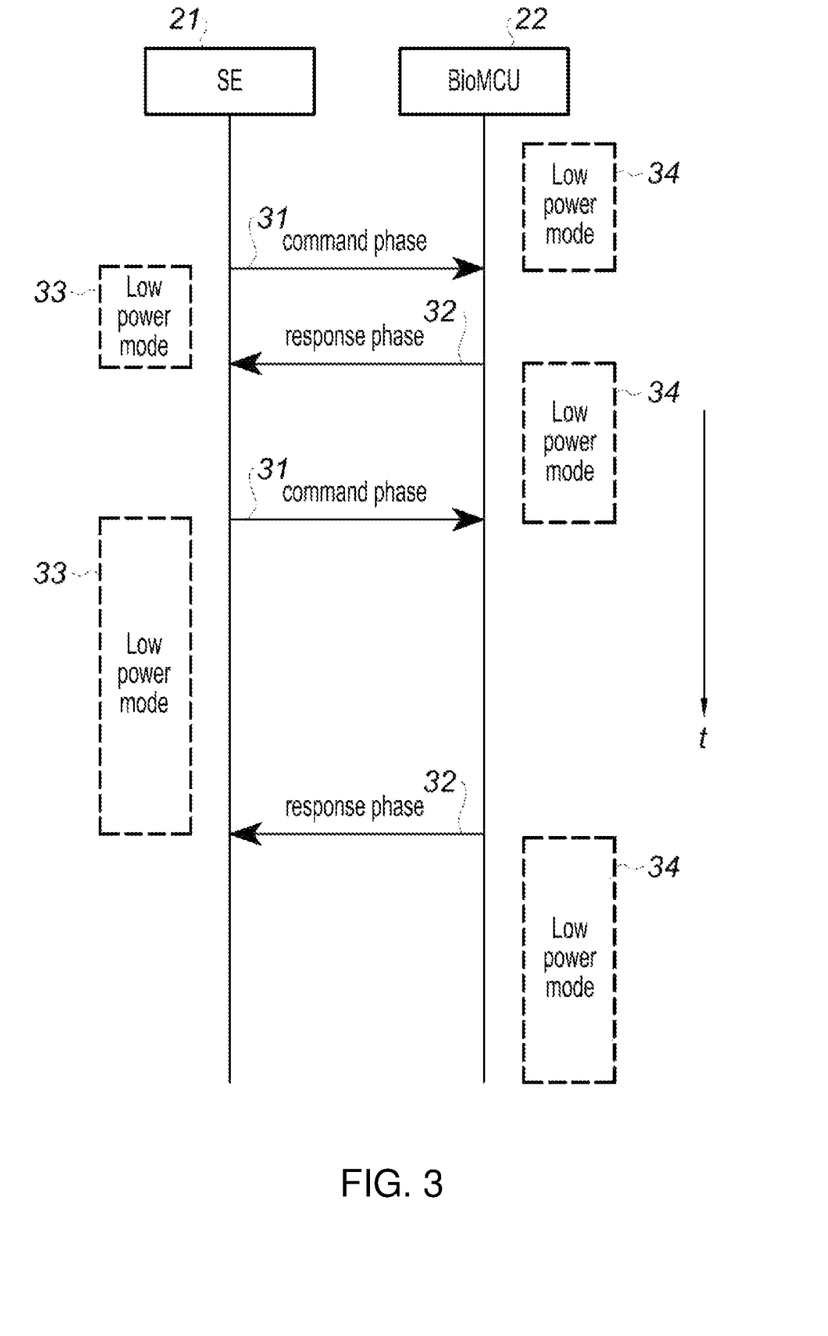
FIG. 3 is a sequence diagram of phases of an embodiment of a communication method.

FIG. 3 is a flowchart of phases of an embodiment of a communication method between the first circuit 21 and the second circuit 22. In particular, FIG. 3 illustrates a progression of steps or phases of a communication between these circuits 21 and 22 as a function of time (t).

According to this embodiment, a communication between the first circuit 21, or master circuit 21, and the second circuit 22, or slave circuit 22, is still engaged by the master circuit 21. In other words, it is assumed that the elements of the biometric environment of the device 2, in other words the slave circuit 22 and the fingerprint sensor 23, do not trigger communications with the master circuit 21.

The communication between the master circuit 21 (SE) and the slave circuit 22 (BioMCU) is done according to phases for: sending commands, from the master circuit 21 to the slave circuit 22, symbolized in FIG. 3 by arrows 31 (command phase); and sending responses, from the slave circuit 22 to the master circuit 21, symbolized in FIG. 3 by arrows 32 (response phase).

These command sending phases 31 and these response sending phases 32 are suspended by periods during which the master circuit 21 and the slave circuit 22 are respectively switched into low power modes 33 and 34. Each low power mode 33, 34 here corresponds to a standby mode, that is to say, a mode in which the electrical power consumption of the circuit 21, 22 is greatly reduced relative to an electrical power consumption of this same circuit 21, 22 during normal operation. This reduction in the electrical power consumption preferably consists of going from a nominal mode in which the consumption is about 10 mA to a standby mode in which the consumption is about 500 µA.

Before the transmission of the first command 31 by the master circuit 21 and after the transmission of each response to the slave circuit 22, the slave circuit 22 is placed or switched in low power mode 34. Similarly, the master circuit 21 is placed or switched in low power mode when the master circuit 21 is waiting for a response 32 from the slave circuit 22. Each circuit 21, 22 leaves low power mode 33, 34 during the sending of a command 31 or a response 32.

As illustrated in FIG. 3, the sending of each response 32 can be separated from the sending of the associated command 31 by a larger or smaller duration. This duration is in particular a function of a number of operations executed by the slave circuit 22 in order to develop the response to be sent. These operations correspond to microprocessor unit instructions or groups of microprocessor unit instructions, executed by the slave circuit 22, for example instructions or groups of instructions associated with image processing operations. The sending of each command 31 can also be separated from the sending of the preceding response by a larger or smaller duration. This duration is in particular a function of a number of operations executed by the master circuit 21 in order to develop the next command to be sent. These operations correspond to microprocessor unit instructions or groups of microprocessor unit instructions, executed by the master circuit 21.

The command 31 sending phases and the response 32 sending phases are each reflected by an exchange, between the circuits 21 and 22, of at least two frames. Depending on whether these phases include data to be communicated, the frames are more specifically exchanged as follows: for a command 31 sending phase without data exchange, the master circuit 21 sends a command header frame, then the slave circuit 22 sends an acknowledgment frame; for a command 31 sending phase with data exchange, the master circuit 21 sends a command header frame, then the slave circuit 22 sends an acknowledgment frame, next the master circuit sends a command data frame and lastly the slave circuit 22 sends another acknowledgment frame; for a response 32 sending frame without data exchange, the slave circuit 22 sends a response header frame, then the master circuit sends an acknowledgment frame; and for a response 32 sending phase with data exchange, the slave circuit 22 sends a response header frame, then the master circuit 21 sends an acknowledgment frame, next the slave circuit 22 sends a response data frame and lastly the master circuit 21 sends another acknowledgment frame.

Figure 4A:
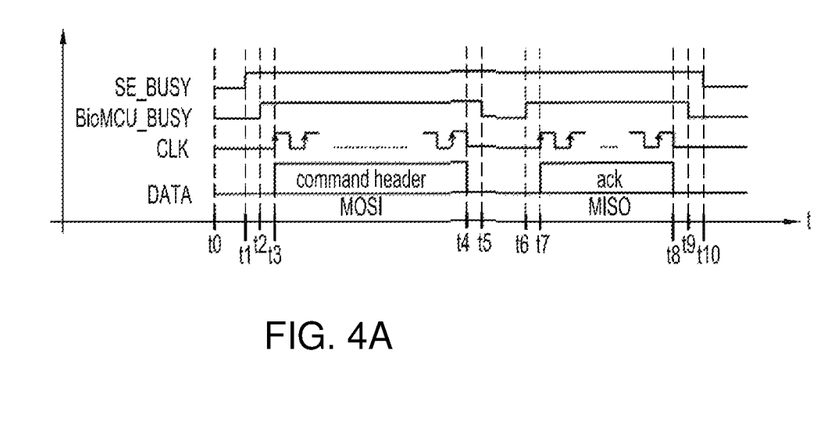
FIGS. 4A and 4B show timing diagrams of phases of the embodiment of the communication method.
Figure 4B:
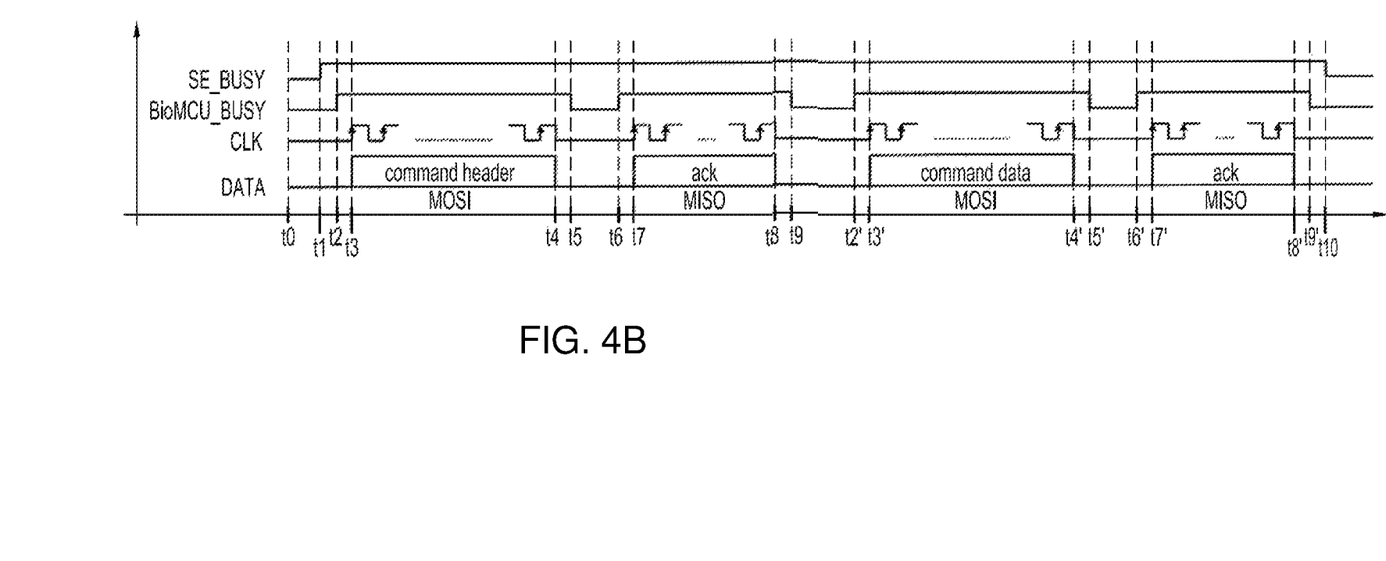

FIGS. 4A and 4B show timing diagrams of phases of the embodiment of the communication method between the circuits 21 and 22. These timing diagrams in particular reflect an evolution, as a function of time (t), of the signals SE_BUSY, BioMCU_BUSY, CLK and DATA.

The timing diagram of FIG. 4A corresponds to a command transmission 31 (FIG. 3) without data exchange while the timing diagram of FIG. 4B corresponds to a command transmission 31 (FIG. 3) with data exchange.

In FIG. 4A, at an initial instant t0, all of the signals SE_BUSY, BioMCU_BUSY, CLK and DATA are at a low state or level. One assumes: that the master circuit 21 is not in low power mode at this instant t0; and that the slave circuit 22 is in low power mode at this instant t0.

At an instant t1, after the instant t0, the signal SE_BUSY is switched from the low state to a high state or level by the master circuit 21. This transition to the high state of the signal SE_BUSY is intended to signify to the slave circuit 22 that the master circuit 21 wishes to send it a command. The slave circuit 22 is then taken out of low power mode and begins a wakeup sequence during which this slave circuit 22 performs various operations related to its exit from standby. The signal BioMCU_BUSY is kept in the low state during all of these operations.

At an instant t2, after the instant t1, the signal BioMCU_BUSY is switched from the low state to a high state by the slave circuit 22. This transition to the high state of the signal BioMCU_BUSY is intended to signify to the master circuit 21 that the slave circuit 22 is ready to receive a command header frame. From the instant t2, the master circuit 21 and the slave circuit 22 are both kept out of low power mode until the end of the command sending phase.

At an instant t3, after the instant t2, the master circuit 21 begins to send its clock signal, that is to say, it periodically switches the clock signal CLK between a low state and a high state. The first switching of the signal CLK from the low state to the high state marks the beginning of the sending of the command header frame. Upon each switch to the high state of the signal CLK, a new bit of the command header frame is sent to the slave circuit 22. The command header frame is sent from the master circuit 21 to the slave circuit 22. The sending of this command header frame therefore corresponds, as described in relation with FIG. 2, to the sending of the signal MOSI over the second conductor 24B of the link 24.

At an instant t4, after the instant t3, the master circuit 21 ceases to emit its clock signal CLK by returning this clock signal CLK to the low state. This last switching of the signal CLK from the high state to the low state marks the end of the sending of the command header frame.

At an instant t5, after the instant t4, the signal BioMCU_BUSY is switched from the high state to the low state by the slave circuit 22. This transition to the low state of the signal BioMCU_BUSY is intended to signify to the master circuit 21 that the slave circuit 22 is occupied executing operations allowing it to generate the acknowledgment frame.

At an instant t6, after the instant t5, the signal BioMCU_BUSY is switched from the low state to the high state by the slave circuit 22. This transition to the high state of the signal BioMCU_BUSY is intended to signify to the master circuit 21 that the slave circuit 22 is ready to send the acknowledgment frame, in response to the command header frame previously received.

At an instant t7, after the instant t6, the master circuit 21 begins to emit its clock signal. The first switching of the signal CLK from the low state to the high state marks the beginning of the sending of the acknowledgment frame (ack). Upon each switching to the high state of the signal CLK, a new bit of the acknowledgment frame is sent to the master circuit 21. The acknowledgment frame is sent from the slave circuit 22 to the master circuit 21. The sending of this acknowledgment frame therefore corresponds, as described in relation with FIG. 2, to the sending of the signal MISO over the second conductor 24B of the link 24.

At an instant t8, after the instant t7, the master circuit 21 ceases to emit its clock signal CLK by returning this clock signal CLK to the low state. This last switching of the signal CLK from the high state to the low state marks the end of the sending of the acknowledgment frame.

At an instant t9, after the instant t8, the signal BioMCU_BUSY is switched from the high state to the low state by the slave circuit 22. This transition to the low state of the signal BioMCU_BUSY is intended to signify to the master circuit 21 that the slave circuit 22 is occupied executing operations allowing it to generate the response frame (not shown in FIG. 4).

At an instant t10, after the instant t9 with a duration set by the master circuit 21, the signal SE_BUSY is switched from the high state to the low state by the master circuit 21. The instant t10 marks the end of the command sending phase 31 (FIG. 3). The transition to the low state of the signal SE_BUSY is therefore preferably accompanied by a switching of the master circuit 21 to the low power state while waiting for a response sending phase initiated by the slave circuit 22. In other words, the master circuit 21 is placed in standby mode after having sent a command to the slave circuit 22.

The timing diagram of FIG. 4B comprises common elements with the timing diagram of FIG. 4A. These elements will not be described in detail again below. The timing diagram of FIG. 4B differs from the timing diagram of FIG. 4A primarily in that the timing diagram of FIG. 4B includes successive moments t2' to t9' intercalated between the instant t9 and the instant t10. The instant t9 is thus separated from the instant t10 by a duration allowing the exchange of the command datum between the circuits 21 and 22.

At the instant t2', after the instant t9, the signal BioMCU_BUSY is switched from the low state to the high state by the slave circuit 22. This transition to the high state of the signal BioMCU_BUSY is intended to signify to the master circuit 21 that the slave circuit 22 is ready to receive a command data frame.

At an instant t3', after the instant t2', the master circuit 21 begins to emit its clock signal. The first switching of the signal CLK from the low state to the high state marks the beginning of the sending of the command data frame (command data). Upon each switch to the high state of the signal CLK, a new bit of the command data frame is sent to the slave circuit 22. The command data frame is sent from the master circuit 21 to the slave circuit 22. The sending of this command data frame therefore corresponds, as described in relation with FIG. 2, to the sending of the signal MOSI over the second conductor 24B of the link 24.

At an instant t4, after the instant t3, the master circuit 21 ceases to emit its clock signal CLK by returning this clock signal CLK to the low state. This last switching of the signal CLK from the high state to the low state marks the end of the sending of the command data frame.

The evolution of the signals SE_BUSY, BioMCU_BUSY, CLK and DATA at the successive moments t5', t6', t7', t8' and t9' is next similar to what was previously described for the successive moments t5, t6, t7, t8 and t9, respectively. The acknowledgment frame (ack) sent between the moments t7' and t8' and the acknowledgment frame sent between the moments t7 and t8 can nevertheless have a different content.

According to a preferred embodiment, each command header frame includes: a first byte corresponding to an identifier of the command to be executed by the slave circuit 22; a second byte corresponding to an energy (power budget) supplied by the electromagnetic field EMF (FIG. 1), in other words an energy that can be allocated to the biometric framework for the execution of its operations, or to an available power; a third byte corresponding to a remaining activity duration value (time budget) of the device 2 (FIG. 1), in other words a duration that can be allocated to the biometric framework for the execution of its operations; a fourth duration making it possible to indicate, to the second circuit 22, whether the command sent by the first circuit 21 constitutes a new command or an instruction to continue execution of a previous command; two bytes corresponding to a data length to be sent; and two other bytes corresponding to a result of a Cyclic Redundancy Check (CRC).

The value of the second byte is preferably representative of an intensity of an electric supply current of the device 2 from the electromagnetic field EMF sent by the terminal 1 (FIG. 1). A macrocell of the first circuit 21 then adapts the operating frequency of this first circuit 21 as a function of this intensity estimate. The first circuit 21 can send the available energy value to another circuit not having such a macrocell, for example the second circuit 22, in order to allow this second circuit 22 to adapt its operating frequency according to the energy that can be delivered to it. The operating frequency of the second circuit 22 can thus be adapted as a function of the energy, here the electrical intensity, able to be allocated to this second circuit 22.

According to this embodiment, the intensity from the electromagnetic field EMF captured by the antenna 20 (FIG. 1) of the device 2 is estimated by a sensor of the first circuit 21. As an example, the intensity is between about 2.5 mA and about 17.5 mA per 0.5 mA pitch for a module of the magnetic component of the EMF field varying between 0.5 A/m and 3 A/m, per pitch of 0.1 A/m. This range of intensities then includes 32 possible values, which allows it to be encoded on 5 bits of the second byte to send it to the second circuit 22.

Likewise, the time budget value is estimated by the first circuit 21 and sent to the second circuit 22.

In a variant, the fourth byte corresponds to a voltage budget supplying the device 2 (FIG. 1), in other words, a voltage that can be allocated to the biometric framework for the execution of its operations. The voltage value allows the second circuit 22 to adapt an internal configuration. The second circuit 22 can for example consume a greater or lesser electrical current depending on the voltage value sent to it by the first circuit 21.

Figure 5A:
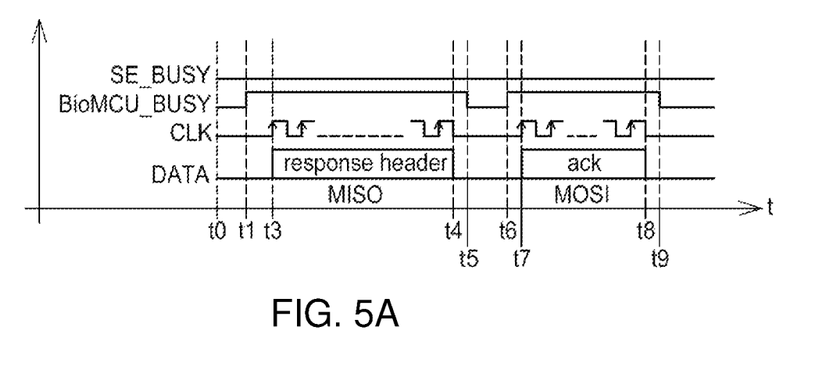
FIGS. 5A and 5B show timing diagrams of other phases of the embodiment of the communication method.
Figure 5B:
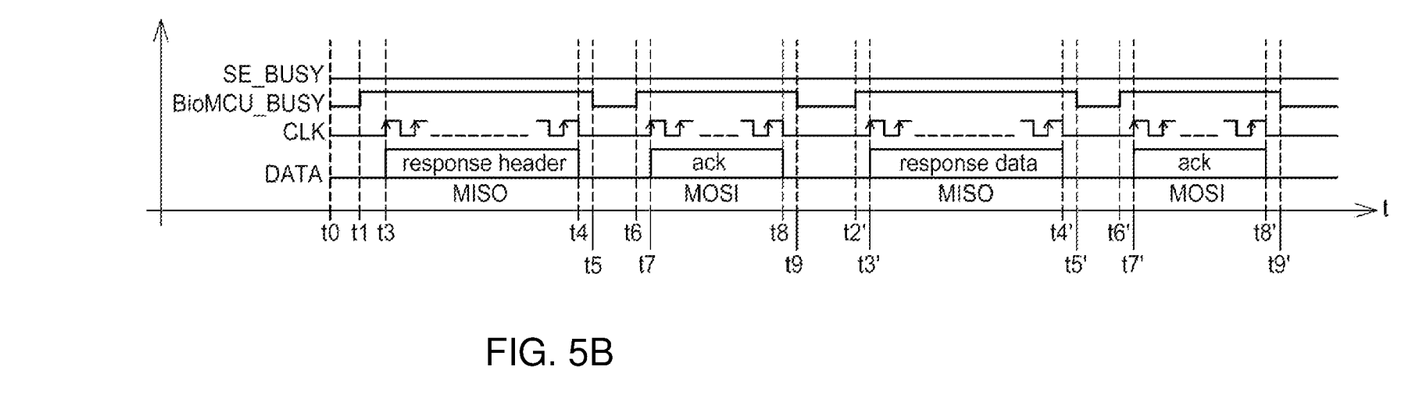

FIGS. 5A and 5B show timing diagrams of other phases of the embodiment of the communication method between the circuits 21 and 22. These timing diagrams in particular reflect an evolution, as a function of time (t), of the signals SE_BUSY, BioMCU_BUSY, CLK and DATA.

The timing diagram of FIG. 5A corresponds to a response transmission 32 (FIG. 3) without data exchange while the timing diagram of FIG. 5B corresponds to a response transmission 32 (FIG. 3) with data exchange.

The timing diagrams of FIGS. 5A-5B comprise common elements with the timing diagrams of FIGS. 4A-4B. These elements will not be described in detail again below. The timing diagrams of FIGS. 5A-5B differ from the timing diagrams of FIGS. 4A-4B primarily in that, in the timing diagrams of FIGS. 5A-5B, it is the master circuit 21 that is removed, by the slave circuit 22, from low power mode. The signals are further exchanged, in FIGS. 5A-5B, in the opposite direction relative to what was described in relation with FIGS. 4A-4B.

In FIG. 5A, at the initial instant t0, all of the signals SE_BUSY, BioMCU_BUSY, CLK and DATA are in the low state (at the low level). It is assume, contrary to what was described in relation with FIGS. 4A-4B: that the master circuit 21 is in low power mode at this instant t0; and that the slave circuit is not in low power mode at this instant t0.

In FIGS. 5A-5B, the signal SE_BUSY is kept in the low state during the entire response sending phase.

At the instant t1, the signal BioMCU_BUSY is switched from the low state to a high state by the slave circuit 22. The transition to the high state of the signal BioMCU_BUSY is intended to signify to the master circuit 21 that the slave circuit 22 wishes to send it a response. The master circuit 21 is then taken out of low power mode and begins a wakeup sequence during which this master circuit 21 performs various operations related to its exit from standby. The master circuit 21 and the slave circuit 22 are both kept out of low power mode until the end of the response sending phase.

Between the moments t3 and t4, the master circuit 21 emits its clock signal CLK and bits of the response header frame are sent to the master circuit 21 upon each period of this signal CLK. The response header frame is sent from the slave circuit 22 to the master circuit 21. The sending of this response header frame therefore corresponds, as described in relation with FIG. 2, to the sending of the signal MISO over the second conductor 24B of the link 24.

Between the moments t7 and t8, the master circuit 21 emits its clock signal CLK and bits of the acknowledgement (ack) frame are sent to the slave circuit 22 upon each period of this signal CLK. The acknowledgment frame is sent from the master circuit 21 to the slave circuit 22. The sending of this acknowledgment frame therefore corresponds, as described in relation with FIG. 2, to the sending of the signal MOSI over the second conductor 24B of the link 24.

At the instant t9, the signal BioMCU_BUSY is switched from the high state to the low state by the slave circuit 22. According to this embodiment, the signal SE_BUSY is kept in the low state between the moments t0 and t9. The timing diagram of FIG. 5A thus does not include an instant t10, unlike the timing diagrams previously disclosed in relation with FIGS. 4A-4B.

The timing diagram of FIG. 5B comprises common elements with the timing diagram of FIG. 5A. These elements will not be described in detail again below. The timing diagram of FIG. 5B differs from the timing diagram of FIG. 5A primarily in that the timing diagram of FIG. 5B includes successive moments t2' to t9' after the instant t9. The instant t9 is thus followed by a duration allowing the exchange of the response datum between the circuits 21 and 22.

At the instant t2', the signal BioMCU_BUSY is switched from the low state to the high state by the slave circuit 22. This transition to the high state of the signal BioMCU_BUSY is intended to signify to the master circuit 21 that the slave circuit 22 is ready to send a response data frame.

At an instant t3', the master circuit 21 begins to emit its clock signal. The first switching of the signal CLK from the low state to the high state marks the beginning of the sending of the response data frame (response data). Upon each switching to the high state of the signal CLK, a new bit of the response data frame is sent to the master circuit 21. The response data frame is sent from the slave circuit 22 to the master circuit 21. The sending of this response data frame therefore corresponds, as described in relation with FIG. 2, to the sending of the signal MISO over the second conductor 24B of the link 24.

At an instant t4', the master circuit 21 ceases to emit its clock signal CLK by returning this clock signal CLK to the low state. This last switching of the signal CLK from the high state to the low state marks the end of the sending of the response data frame.

The evolution of the signals SE_BUSY, BioMCU_BUSY, CLK and DATA at the successive moments t5', t6', t7', t8' and t9' is next similar to what was previously described for the successive moments t5, t6, t7, t8 and t9, respectively. The acknowledgment frame (ack) sent between the moments t7' and t8' and the acknowledgment frame sent between the moments t7 and t8 can nevertheless have a different content. The acknowledgment frame sent between the moments t7' and t8' and the acknowledgment frame sent between the moments t7 and t8 are here, unlike what was described in relation with FIGS. 4A-4B, emitted by the master circuit 21 to the slave circuit 22.

At the instant t9', the signal BioMCU_BUSY is switched from the high state to the low state by the slave circuit 22. According to this embodiment, the signal SE_BUSY is kept in the low state between the moments t0 and t9'. The timing diagram of FIG. 5B thus does not include an instant t10, unlike the timing diagrams disclosed in relation with FIGS. 4A-4B.

According to a preferred embodiment, each response header frame includes: two first bytes corresponding to a status of the command executed by the slave circuit 22; a second byte making it possible to indicate, to the master circuit 21, whether the slave circuit 22 is waiting to receive a new command or a command with the same identifier for which it is meant to continue the execution; a third byte corresponding to a maximum sending frequency value, on the link 24 (FIGS. 1 and 2), compatible with the energy that can be allocated by the master circuit 21 to the biometric framework; two bytes corresponding to a data length to be sent; and two other bytes corresponding to a result of a Cyclic Redundancy Check (CRC).

The value of the third byte of the response frame in particular makes it possible for the master circuit 21 to adapt the sending frequency on the link as a function of variations of the energy coming from the electromagnetic field. An increase in the energy can, in particular, lead to an increase in the sending frequency. Conversely, a decrease in the energy can lead to a decrease in the sending frequency.

According to this embodiment, a response sending by the slave circuit 22 is preceded by a command sending by the master circuit 21. Different cases of alternating sequences of commands and responses are thus possible, depending on whether these commands and/or these responses include data, the implementation of these different cases being within the capabilities of one skilled in the art from the above information.

According to a preferred embodiment, error management operations are provided in case of malfunction affecting the slave circuit 22. During normal operation, each placement in the high state of the signal SE_BUSY is meant to be accompanied, several moments later, by a placement in the high state of the signal BioMCU_BUSY. A time delay is launched at the time of the switching to the high state of the signal SE_BUSY. In the case where the master circuit 21 observes that the signal BioMCU_BUSY has not been switched to the high state before expiration of the time delay, it is considered that the slave circuit 22 is not responding.

Still according to this preferred embodiment, one or several other time delays are launched after the sending of a command header, a response header, a command and/or a response. In the case where this or these other time delay(s) expire before the associated acknowledgment frame is sent, it is considered that the slave circuit 22 is not responding.

Furthermore, if the acknowledgment frame does not contain the value expected by the recipient circuit of this frame, the preceding frame may be resent. In the case where several successive acknowledgment frames do not contain the expected value, for example after three successive acknowledgment frames not corresponding to the frame expected by the recipient circuit, it may also be considered that the slave circuit 22 is not responding.

Figure 6:
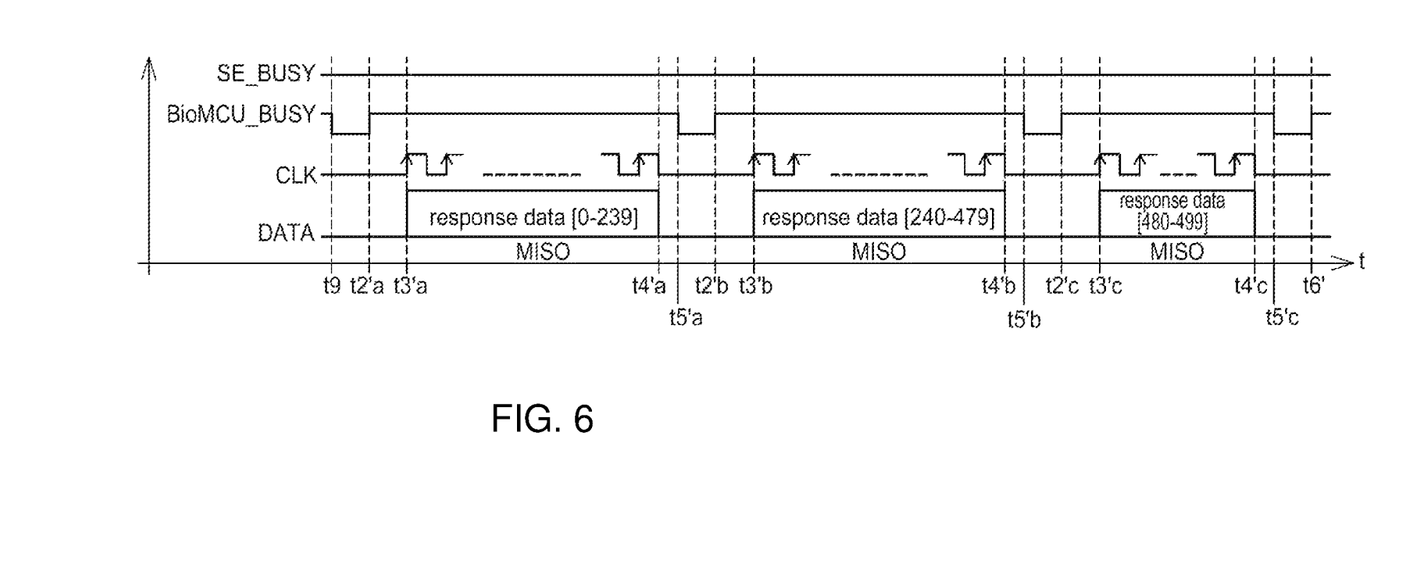
FIG. 6 is a timing diagram of still another phase of the embodiment of the communication method.

FIG. 6 is a timing diagram of still another phase of the embodiment of the communication method between the circuits 21 and 22. This timing diagram in particular reflects an evolution, as a function of time (t), of the signals SE_BUSY, BioMCU_BUSY, CLK and DATA.

The timing diagram of FIG. 6 corresponds to a response sending 32 (FIG. 3) with data exchange, in a situation where the length or size of the response datum, that is to say, the number of bytes of this datum, exceeds the limit length of a frame. This situation for example corresponds to a case where the slave circuit 22 sends the master circuit 21 a datum representative of analysis results of a fingerprint whose length exceeds the limit length of a frame.

It is assumed, for the communication method implemented on the link 24, that the limit length of a frame is equal to 240 bytes. When the length of the response datum to be sent is greater than 240 bytes, this datum is divided into as many words as necessary, each word not exceeding 240 bytes. The sending of the response datum then amounts to performing, during a same response phase 32 (FIG. 3), successive transmission of frames each corresponding to a word of the response datum.

FIG. 6 illustrates, as an example, a situation in which the slave circuit 22 sends, to the master circuit 21, a response datum including 500 bytes. This datum including 500 bytes is, still in this example, divided into: a first word (response data [0-239]) made up of the first 240 bytes of the response datum; a second word (response data [240-479]) made up of the following 240 bytes of the response datum; and a third word (response data [480-499]) made up of the last 20 bytes of the response datum.

The timing diagram of FIG. 6 comprises common elements with the timing diagram of FIG. 5B. These elements will not be described in detail again below. The timing diagram of FIG. 6 differs from the timing diagram of FIG. 5B primarily in that the operations separating the moments t2' to t6' described in relation with FIG. 5B are repeated several times in FIG. 6. In particular, successive moments t2'a, t3'a, t4'a, t5'a, t2'b, t3'b, t4'b, t5'b, t2'c, t3'c, t4'c and t5'c are intercalated between the moments t9 and t6'.

At the instant t2'a, which is analogous to the instant t2' of FIG. 5B, the signal BioMCU_BUSY is switched from the low state to the high state by the slave circuit 22. This transition to the high state of the signal BioMCU_BUSY is intended to signify to the master circuit 21 that the slave circuit 22 is ready to send a first frame containing the first word of the response datum.

At the instant t3'a, which is analogous to the instant t3', the master circuit 21 begins to emit its clock signal. The first switching of the signal CLK from the low state to the high state marks the beginning of the sending of the first frame. Upon each switching to the high state of the signal CLK, a new bit of the first frame, therefore of the first word, is sent to the master circuit 21. The first frame is sent from the slave circuit 22 to the master circuit 21. The sending of this first frame therefore corresponds, as described in relation with FIG. 2, to the sending of the signal MISO over the second conductor 24B of the link 24.

At an instant t4'a, which is analogous to the instant t4', the master circuit 21 ceases to emit its clock signal CLK by returning this clock signal CLK to the low state. This last switching of the signal CLK from the high state to the low state marks the end of the sending of the first frame.

At the instant t5'a, which is analogous to the instant t5', the signal BioMCU_BUSY is switched to the low state. The slave circuit 22 thus indicates to the master circuit 21 that it is not ready to send or to receive.

The signals SE_BUSY, BioMCU_BUSY, CLK and DATA next evolve at the successive moments t2'b, t3'b, t4'b and t5'b after the instant t5'a, similarly to what was described previously for the successive moments t2'a, t3'a, t4'a and t5'a, respectively, with the sole difference that the moments t3'b and t4'b frame the sending of a second frame containing the second word of the response datum. Similarly, the signals SE_BUSY, BioMCU_BUSY, CLK and DATA next evolve at the successive moments t2'c, t3'c, t4'c and t5'c after the instant t5'b, similarly to what was described previously for the successive moments t2'a, t3'a, t4'a and t5'a, respectively, with the sole difference that the moments t3'c and t4'c frame the sending of a third frame containing the third word of the response datum.

During a contactless communication, an effort is made so that the first circuit 21, the second circuit 22 and the biometric sensor 23 consume as little energy as possible. Preferably, the biometric framework, that is to say, the second circuit 22 and the biometric sensor 23, are thus only taken out of low power mode in two cases: during an initial start-up phase, during which the card (FIG. 1) is brought closer to the terminal 1 (FIG. 1) so that this card is powered by this terminal 1; and between the beginning of a command sending phase 31 (FIG. 3) and the end of the associated response sending phase 32 (FIG. 3). Outside of these two cases, the biometric framework is placed in standby mode after each end of response sending phase 32.

In a variant, the biometric framework is only supplied when it is stressed by the first circuit 21. The biometric framework is then started upon stress from the first circuit 21 and the sending of a first command is initiated by the first circuit 21 when the signal BioMCU_BUSY is switched to the low state.

According to an embodiment, a suspension sometimes occurs during an activity period of the biometric framework, between the sending of a command and the sending of the associated response. In practice, this suspension can appear in case of a wait time extension (WTX) request. Such a wait time extension request in particular occurs when the card 2 needs the terminal 1 to grant it additional time before stopping the emission of the field, therefore cutting the supply of this card 2.

For banking applications of the contactless payment type, the wait time extension request is typically sent after about 38 ms, at most: after reception of an application protocol data unit (APDU) command; or after reception of the last wait time extension request.

According to a preferred embodiment, a time delay or timer is activated by the first circuit 21 after each APDU reception or wait time extension request reception. An expiration of this time delay then makes it possible to indicate, to the first circuit 21, an opportune instant to make the next time delay extension request. This time delay is, in this example, initially set at a value of less than 38 ms.

If this time delay expires at an instant where the second circuit 22 is not in low power mode, in other words if this time delay expires while the second circuit 22 is active, the first circuit 21 then sends this second circuit 22 a suspension command. This suspension command seeks to suspend operations performed by the second circuit 22 and to temporarily switch this second circuit 22 to low power mode.

Figure 7:
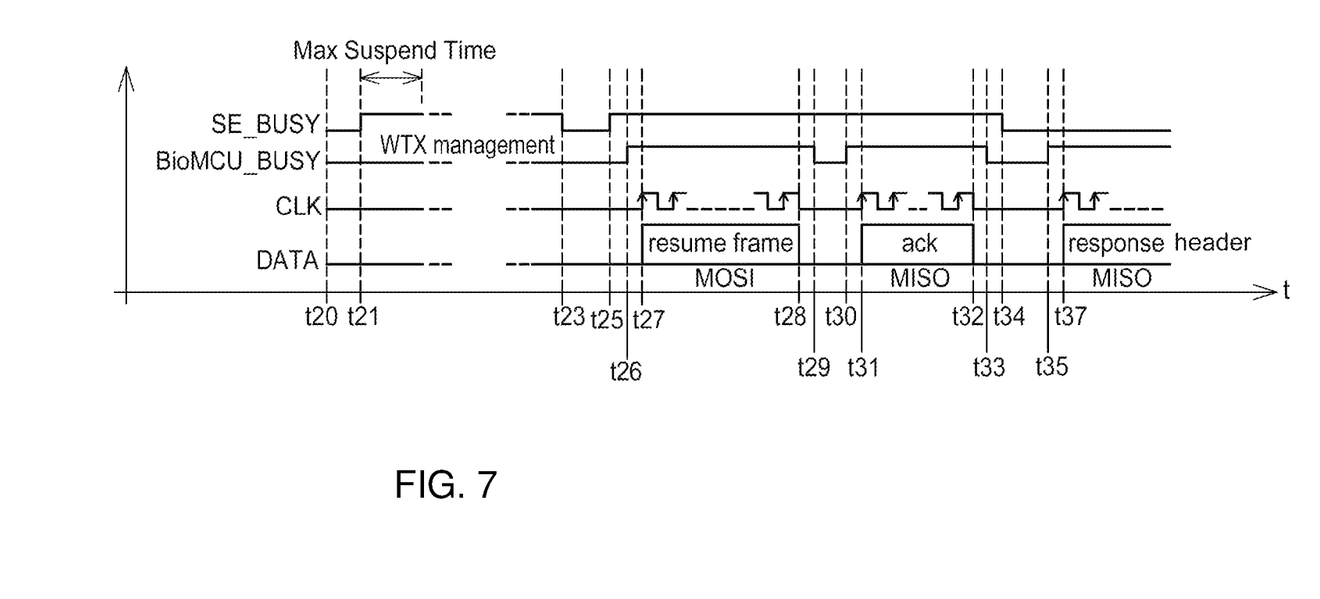
FIG. 7 is a timing diagram of still another phase of the embodiment of the communication method.

FIG. 7 is a timing diagram of still another phase of the embodiment of the communication method between the circuits 21 and 22, in case of sending of a suspension command. This timing diagram in particular reflects an evolution, as a function of time (t), of the signals SE_BUSY, BioMCU_BUSY, CLK and DATA.

The timing diagram of FIG. 7 corresponds to a situation in which the time delay expires while the slave circuit 22 is active. The master circuit 21 will therefore send a suspension command to the slave circuit 22 in order to place this second circuit in low power mode.

It is assumed, in FIG. 7, that the signals SE_BUSY, BioMCU_BUSY, CLK and DATA are initially all in the low state at an instant t20. It is further assumed that this instant t20 is intercalated between a command sending phase and a response sending phase. The signal BioMCU_BUSY is thus meant to go to the high state after the instant t20 to initiate a response sending phase. In FIG. 7, contrary to what one might expect (since one is meant to begin a response sending phase, normally the rising of the signal BioMCU_BUSY is expected), it is the signal SE_BUSY that is placed in the high state for the instant t20.

At an instant t21, after the instant t20, the signal SE_BUSY is thus switched from the low state to the high state by the master circuit 21. This transition to the high state of the signal SE_BUSY is intended to signify to the slave circuit 22 that the master circuit 21 wishes to suspend it.

From the instant t21, the slave circuit 22 detects and executes the suspension command. This slave circuit 22 is switched to low power mode. After a duration, denoted Max Suspend Time, operations (WTX management) to manage the time extension request are then performed by the master circuit 21. The Max Suspend Time duration is great enough to guarantee that the slave circuit 22 has indeed switched to low power mode before beginning max suspend time management operations. The slave circuit 22 is thus placed in standby mode during a communication of the master circuit 21 with the outside of the card 2 (FIG. 1).

At an instant t23, after the instant t21, the signal SE_BUSY is thus switched from the high state to the low state by the master circuit 21. The instant t23 marks the end of the management of the max suspend time by this master circuit 21. The switching of the signal SE_BUSY to the low state causes the slave circuit 22 to exit the low power mode. This amounts to sending the slave circuit 22 a command to resume the operations executed by this slave circuit 22 before the transmission of the suspension command.

The slave circuit 22 is then taken out of low power mode and begins a wakeup sequence during which this slave circuit 22 performs various operations related to its exit from standby. The signal BioMCU_BUSY is kept in the low state during all of these operations.

At an instant t25, after the instant t23, the signal SE_BUSY is switched from the low state to the high state by the master circuit 21. This means that the master circuit 21 wishes to send a resume frame to the slave circuit 22.

At an instant t26, after the instant t25, the signal BioMCU_BUSY is switched from the low state to the high state by the slave circuit 22. This transition to the high state of the signal BioMCU_BUSY, which here follows the transition to the high state of the signal SE_BUSY, is intended to signify to the master circuit 21 that the slave circuit 22 is ready to receive the resume frame.

At an instant t27, after the instant t26, the master circuit 21 emits its clock signal CLK. The first switching of the signal CLK from the low state to the high state marks the beginning of the sending of the resume frame. Upon each switch to the high state of the signal CLK, a new bit of the resume frame is sent to the slave circuit 22. The resume frame is sent from the master circuit 21 to the slave circuit 22. The sending of this resume frame therefore corresponds, as described in relation with FIG. 2, to the sending of the signal MOSI over the second conductor 24B of the link 24.

According to a preferred embodiment, the resume frame includes bytes similar to those of a command header frame as described in relation with FIGS. 4A-4B. In particular, the resume frame includes the third byte corresponding to the time budget allocated to the biometric framework for the execution of its operations. This time budget more specifically corresponds, still according to this preferred embodiment, to a remaining duration of the time delay suitable for providing the following wait time extension. This thus advantageously allows the master circuit 21 to communicate, to the slave circuit 22, the duration that this slave circuit 22 has to perform its operations before the next wait time extension.

At an instant t28, after the instant t27, the master circuit 21 stop emitting its clock signal CLK. This instant t28 thus marks the end of the sending of the resume frame.

At an instant t29, after the instant t28, the signal BioMCU_BUSY is switched from the high state to the low state by the slave circuit 22. This transition to the low state of the signal BioMCU_BUSY is intended to signify to the master circuit 21 that the slave circuit 22 is occupied executing operations allowing it to generate the acknowledgment frame.

At an instant t30, after the instant t29, the signal BioMCU_BUSY is switched from the low state to the high state by the slave circuit 22. This transition to the high state of the signal BioMCU_BUSY is intended to signify to the master circuit 21 that the slave circuit 22 is ready to send the acknowledgment frame, in response to the resume frame previously received.

At an instant t31, after the instant t30, the master circuit 21 begins to emit its clock signal and the acknowledgment frame is sent by the slave circuit 22 to the master circuit 21. The sending of this acknowledgment frame therefore corresponds, as described in relation with FIG. 2, to the sending of the signal MISO over the second conductor 24B of the link 24.

At an instant t32, after the instant t31, the master circuit 21 stops emitting its clock signal CLK. This instant t32 thus marks the end of the sending of the acknowledgment frame.

At an instant t33, after the instant t32, the signal BioMCU_BUSY is switched from the high state to the low state by the slave circuit 22. This transition to the low state of the signal BioMCU_BUSY is intended to signify to the master circuit 21 that the slave circuit 22 is occupied continuing to execute operations allowing it to generate the response frame.

At an instant t34, after the instant t33, the signal SE_BUSY is thus switched from the high state to the low state by the master circuit 21. The instant t34 marks the end of the sending of the resume frame and of the associated acknowledgment frame. The transition to the low state of the signal SE_BUSY is therefore preferably accompanied by a switching of the master circuit 21 to the low power state while waiting for the response sending phase initiated by the slave circuit 22.

At an instant t35, after the instant t34, the signal BioMCU_BUSY is switched from the low state to the high state by the slave circuit 22. This transition to the high state of the signal BioMCU_BUSY is intended to signify to the master circuit 21 that the slave circuit 22 wishes to send it a response. The master circuit 21 is then taken out of low power mode and begins a wakeup sequence during which this master circuit 21 performs various operations related to its exit from standby. The signal SE_BUSY is kept in the low state during all of these operations.

It is then assumed that no suspension command is sent to the slave circuit 22 by the master circuit 21.

At an instant t37, after the instant t35, the master circuit 21 emits its clock signal CLK and bits of the response header frame are sent to the slave circuit 22 upon each period of this signal CLK. The response header frame is sent from the slave circuit 22 to the master circuit 21. The sending of this response header frame therefore corresponds, as described in relation with FIG. 2, to the sending of the signal MISO over the second conductor 24B of the link 24.

According to this embodiment, a competition situation (race case), between the suspension command and the response frame sending request, may sometimes occur. Such a situation may in particular arise when the master circuit 21 commands the suspension of the slave circuit 22 approximately at the instant where the slave circuit 22 prepares to send a response. This for example corresponds to a quasi-simultaneous rise of the signals SE_BUSY and BioMCU_BUSY at the instant t21.

In this case, priority is given to the suspension command sent by the master circuit 21. The signal BioMCU_BUSY is then switched to the low state before expiration of the Max Suspend Time duration. The suspension command is next taken into account by the slave circuit 22, which enters standby mode to allow the management of the wait time extension by the master circuit 21.

Still according to this embodiment, the switch to the high state of the signal SE_BUSY therefore corresponds to: the sending of a command, when the slave circuit 22 is in standby mode; or the sending of a suspension command, when the master circuit 21 is waiting for a response from the slave circuit 22.

Figure 8A:
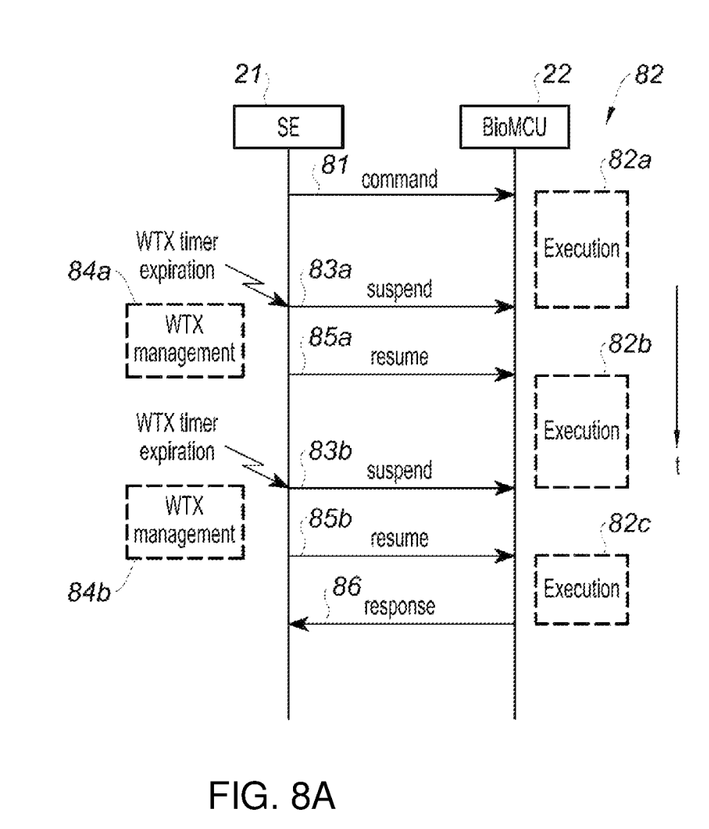
FIGS. 8A and 8B show flowcharts of other steps of the embodiment of the communication method.
Figure 8B:
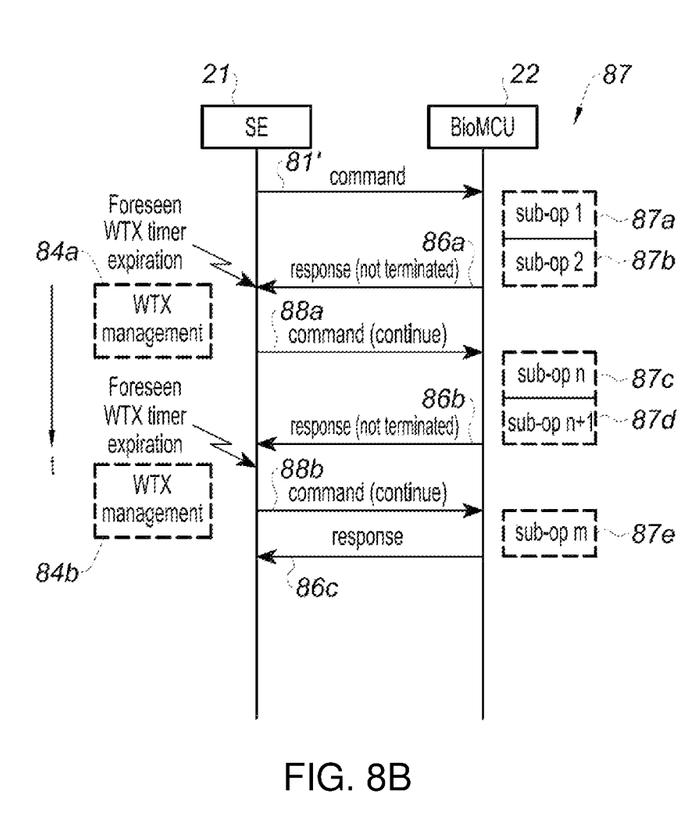

FIGS. 8A and 8B show flowcharts of other steps of the embodiment of the communication method. In particular, FIGS. 8A-8B illustrate a progression of steps or phases of a communication between the circuits 21 and 22 as a function of time (t).

According to this embodiment, the second circuit 22 performs two types of operations or tasks: so-called interruptible tasks, in other words, operations whose execution can be suspended at any time, then resumed without impact on the operation; and so-called uninterruptible tasks, in other words, operations whose execution cannot be suspended until it has been completed.

An example of an interruptible task is an analysis, by the second circuit 22, of an image obtained by the fingerprint sensor 23 in order to extract minutiae therefrom, that is to say, to produce a reduced fingerprint. An example of an uninterruptible task is a communication between the second circuit 22 and the fingerprint sensor 23.

FIG. 8A shows, schematically, a communication diagram between the first circuit 21 and the second circuit 22 in a case where this second circuit 22 executes an interruptible operation 82. The first circuit 21 sends, to the second circuit 22, a command (arrow 81, command) to execute this interruptible operation 82. The second circuit 22 then begins the execution (block 82a, Execution) of the interruptible operation 82 commanded by the first circuit 21.

After a duration corresponding to the expiration (WTX timer expiration) of the time delay making it possible to anticipate the next wait time extension, a suspension command (arrow 83a, suspend) is sent to the second device 22, as described in relation with FIG. 7. This results in suspending the execution 82a, by the second circuit 22, of the interruptible operation 82 and allowing the first circuit 21 to manage (block 84a, WTX management) the wait time extension. A resume command (arrow 85a, resume) is then sent to the second circuit 22. This second circuit 22 then resumes the execution (block 82b, Execution) of the interruptible operation 82.

After a duration corresponding to the expiration (WTX time expiration) of the time delay making it possible to anticipate the next wait time extension, a new suspension command (arrow 83b, suspend) is sent to the second device 22. This results in suspending the execution 82b, by the second circuit 22, of the interruptible operation 82 and allowing the first circuit 21 to manage (block 84b, WTX management) the wait time extension. A new resume command (arrow 85b, resume) is then sent to the second circuit 22. This second circuit 22 then resumes the execution (block 82c, Execution) of the interruptible operation 82.

Once the execution 82c of the interruptible operation 82 is complete, a response (arrow 86, response) is sent by the second circuit 22. This response for example contains output data of the execution 82a, 82b, 82c of the interruptible operation 82.

It is assumed, in FIG. 8A, that only two suspensions, each arising from the need to manage a wait time extension, take place during the execution of the interruptible operation. It is understood, however, that in practice, the interruptible operation can be suspended by any number of suspensions, the implementation of such a variant being within the capabilities of one skilled in the art from the information supplied in this disclosure.

FIG. 8B shows, schematically, a communication diagram between the first circuit 21 and the second circuit 22 in a case where this second circuit 22 executes an operation 87, for example an interruptible operation able to be divided or split into several uninterruptible sub-operations or subtasks. It is assumed, according to this embodiment, that each sub-operation can be executed during a duration shorter than the duration separating two successive wait time extensions.

The first circuit 21 sends, to the second circuit 22, a command (arrow 81, command) to execute the operation 87. The second circuit 22 then executes, in the example of view B, a first uninterruptible sub-operation (block 87b, sub-op 1), then a second uninterruptible sub-operation (block 87b, sub-op 2) of the operation 87 commanded by the first circuit 21.

After a duration preceding the foreseen expiration (Foreseen WTX timer expiration) of the time delay making it possible to foresee the next wait time extension, a response (arrow 86a, response (not terminated)) is sent to the first device 21. This results in allowing the first circuit 21 to manage (block 84a, WTX management) the wait time extension. A resume command (arrow 88a, command (continue)) is then sent to the second circuit 22. This second circuit 22 then executes, still in the example of FIG. 8B, a third uninterruptible sub-operation (block 87c, sub-op n), then a fourth uninterruptible sub-operation (block 87d, sub-op n+1) of the operation 87 commanded by the first circuit 21.

After a duration preceding the foreseen expiration (Foreseen WTX timer expiration) of the time delay making it possible to foresee the following wait time extension, a new response (arrow 86b, response (not terminated)) is sent to the first device 21. This results in allowing the first circuit 21 to manage (block 84b, WTX management) the second wait time extension. A new resume command (arrow 88b, command (continue)) is then sent to the second circuit 22. This second circuit 22 then executes, again in the example of view B, a fifth and final uninterruptible sub-operation (block 87e, sub-op m) completing the operation 87 commanded by the first circuit 21.

It is assumed, in FIG. 8B, that only two suspensions, each arising from the need to manage a wait time extension, take place during the execution of the operation. It is understood, however, that in practice, the operation can be suspended by any number of suspensions, the implementation of such a variant being within the capabilities of one skilled in the art from the information supplied in this disclosure.

According to a preferred embodiment, the command 81' and the resume commands 88a and 88b contain the energy budget and the time budget allocated to the second circuit 22 until the next wait time extension management. This advantageously allows the second circuit 22 to calculate a number of uninterruptible operations that can be executed before the next suspension as a function, in particular, of the available energy.

It is thus possible to develop a strategy for executing operations by the second circuit 22. In a case, in particular, of an operation including uninterruptible sub-operations, this second circuit 22 is able to decide how many uninterruptible sub-operations can be performed before the next suspension. This makes it possible to limit a risk of suspension during an execution of an uninterruptible sub-operation. One thus also optimizes the execution of uninterruptible sub-operations of a given operation.

Various embodiments and variants have been described. Those skilled in the art will understand that certain features of these embodiments can be combined and other variants will readily occur to those skilled in the art. What has been described in relation with the embodiments and modes of implementation in which the synchronization signal CLK is at the low level by default, the acquisition of data being done on the rising edges of the signal CLK, can be transposed to a reverse level and reverse edges (high level and falling edges).

Furthermore, what has been described in particular in relation with embodiments and modes of implementation in which the sensor 23 is a fingerprint sensor more generally applies to other types of biometric sensors 23, for example facial recognition sensors.

Finally, the practical implementation of the embodiments and variants described herein is within the capabilities of those skilled in the art based on the functional description provided hereinabove. In particular, what is more specifically described in relation with an exemplary application to a communication between a microcontroller unit executing secure operations and a biometric microcontroller unit more generally applies to any communication between a master circuit or device and a slave circuit or device.

The invention claimed is:

1. A device, comprising:
a first element and a second element connected by a communications link;
wherein the first element includes an energy harvesting circuit configured to harvest energy from an electromagnetic field;
wherein the second element includes a processing circuit having an operating frequency;
wherein the first element is configured to transmit a first piece of information over the communications link that is representative of an energy-related power budget that is supplied to the device by said electromagnetic field, said first piece of information being indicative of an intensity of an electrical supply current; and
wherein the second element is configured to adapt the operating frequency as a function of the first piece of information.

2. The device according to claim 1, wherein the first element is a secure electronic circuit.

3. The device according to claim 1, wherein the processing circuit is a microcontroller.

4. The device according to claim 1, further comprising a fingerprint sensor coupled to the processing circuit.

5. The device according to claim 1, wherein the first element includes a power management circuit coupled to receive energy from said energy harvesting circuit and configured to supply power to the second element.

6. The device according to claim 5, wherein said electrical supply current is provided by the power management circuit to the second element from the energy harvested by said energy harvesting circuit.

7. The device according to claim 1, wherein the device further comprises means for externally communicating without contact using a radiofrequency signal.

8. The device according to claim 1, wherein the device further comprises means for communicating externally with contact using a wired signal.

9. The device according to claim 1, wherein the first element is further configured to send a second piece of information over the communications link that is representative of a remaining time budget of the device; and
wherein the second element is further configured to perform a number of operations as a function of the second piece of information.

10. The device according to claim 9, wherein said remaining time budget of the device concerns an amount of time available for the second element to perform operations given the energy harvested by said energy harvesting circuit.

11. The device according to claim 1, wherein the first element is further configured to send a third piece of information over the communications link that is representative of a voltage budget of the device; and
wherein the second element is further configured to adapt an internal configuration as a function of the third piece of information.

12. The device according to claim 11, wherein said voltage budget of the device concerns an amount of voltage available for the second element to perform operations given the energy harvested by said energy harvesting circuit.

13. The device according to claim 1, wherein the communications link comprises:
a clock signal path;
a bidirectional data path;
a first element busy signal path; and
a second element busy signal path.

14. The device according to claim 13, wherein said first and second elements selectively apply signals to the first element busy signal path and the second element busy signal path, respectively, in order to synchronize data exchange between the first and second elements over the bidirectional data path.

15. The device according to claim 13, wherein said first and second elements selectively apply signals to the first element busy signal path and the second element busy signal path, respectively, in order to control exit of the first and second elements from standby mode.

16. The device according to claim 13, wherein said first and second elements selectively apply signals to the first element busy signal path and the second element busy signal path, respectively, in order to control power consumption by the second element.

17. The device according to claim 1, wherein the device is implemented as a payment card.

18. The device according to claim 17, wherein the second element includes a fingerprint sensor.

19. The device according to claim 17, wherein the payment card includes means for externally communicating without contact using a radiofrequency signal.

20. The device according to claim 17, wherein the payment care includes means for communicating externally with contact using a wired signal.

* * * * *